United States Patent

[11] 3,581,677

| [72] | Inventor | Leonard R. Strong<br>Eugene, Oreg. |
|---|---|---|
| [21] | Appl. No. | 806,341 |
| [22] | Filed | Feb. 19, 1969 |
| [45] | Patented | June 1, 1971 |
| [73] | Assignee | Davidson Baking Co.<br>Portland, Oreg. |

[54] MACHINE FOR LOADING BAKING PANS
6 Claims, 11 Drawing Figs.

[52] U.S. Cl. .................................................. 107/7, 107/45
[51] Int. Cl. ...................................................... A21b 3/00
[50] Field of Search .......................................... 107/7, 45

[56] References Cited
UNITED STATES PATENTS

| 2,454,316 | 11/1948 | Haecks | 107/7X.2 |
| 2,472,073 | 6/1949 | Haecks | 107/7.2 |
| 2,536,249 | 1/1951 | Archer | 107/7X.2 |

Primary Examiner—Louis K. Rimrodt
Attorney—James D. Givnan, Jr.

ABSTRACT: The present disclosure is of a machine operable in conjunction with other bakery conveyor arrangements to accomplish the deposit of pastry articles to be baked into consecutively presented baking pans. A pan conveyor assembly is shown mountable within a framework and is operable to receive bakery pans and continuously move them along past the discharge point of associated bakery conveyor arrangements to receive the discharged pastry articles. A second conveyor assembly is interchangeable with the pan conveyor assembly to permit both panned and unpanned bakery products to be handled along one production line. The pan conveyor assembly includes a belt powered in a manner allowing for precise speed settings for synchronization of pan delivery to receive the pastry articles. The belt as shown travels closely beneath the discharge point of the associated conveyor arrangement.

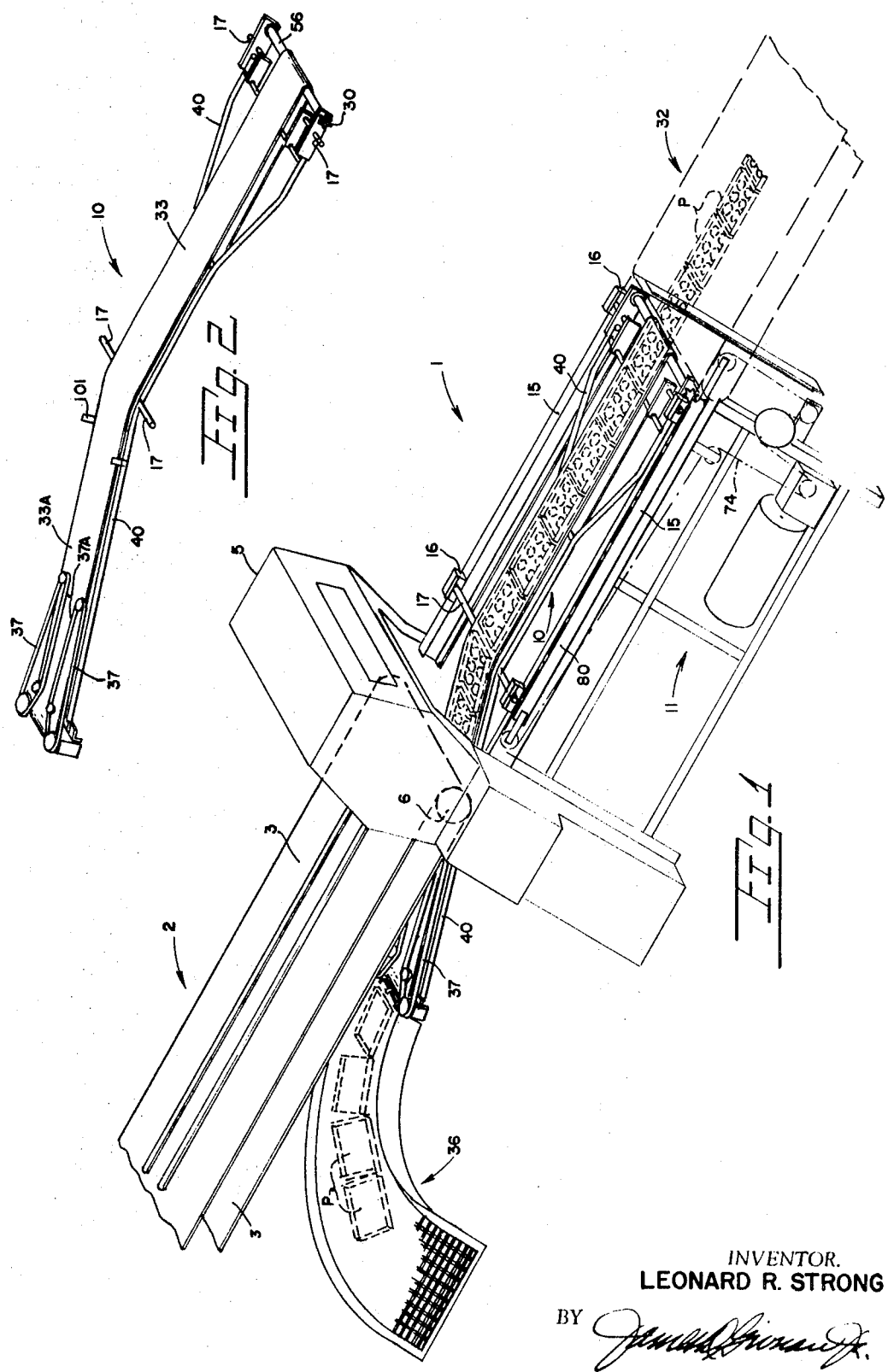

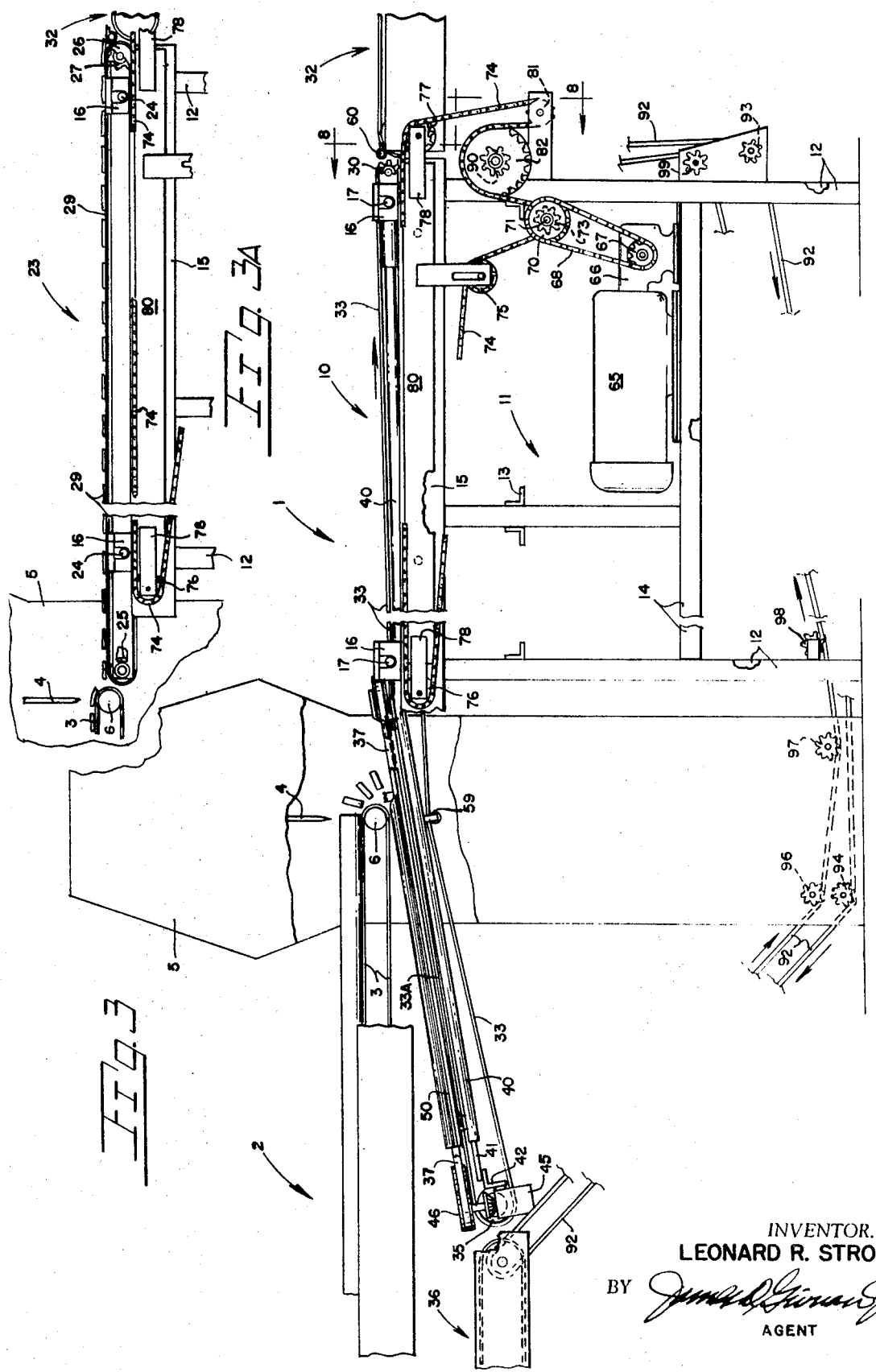

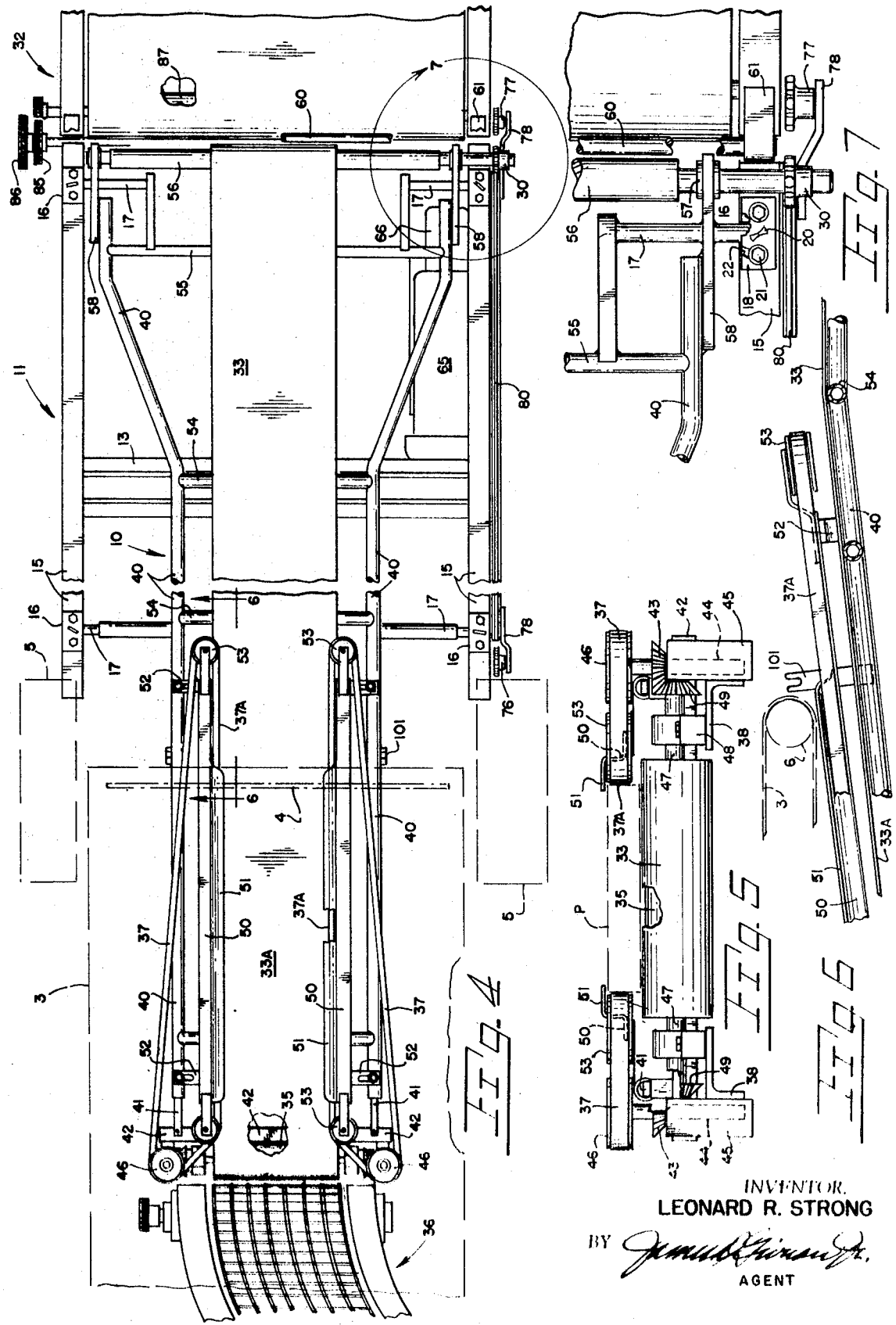

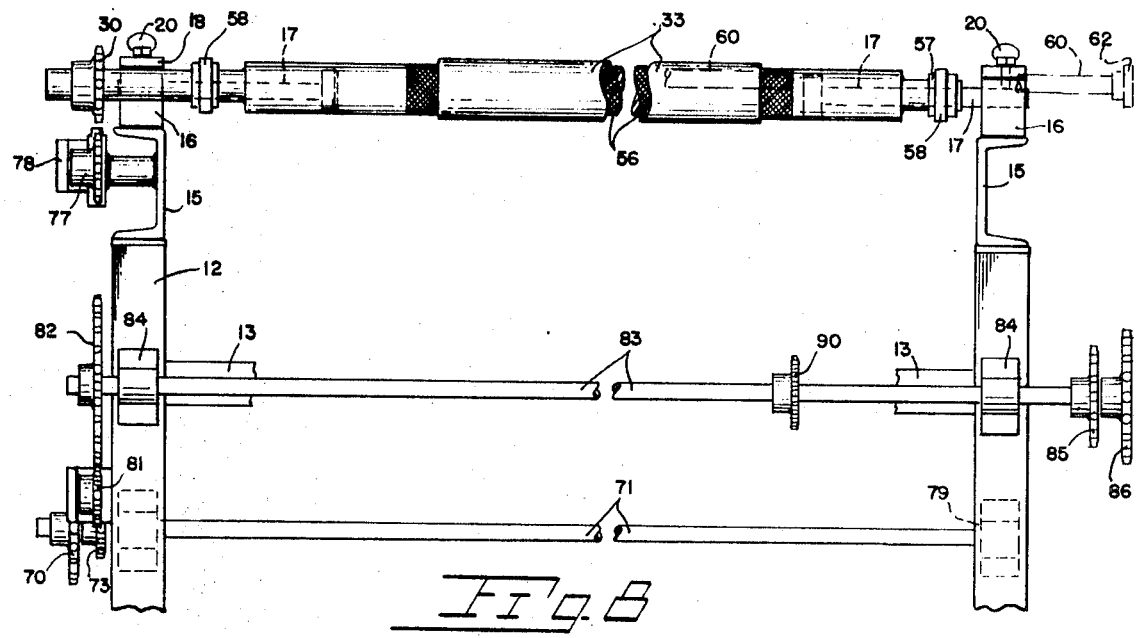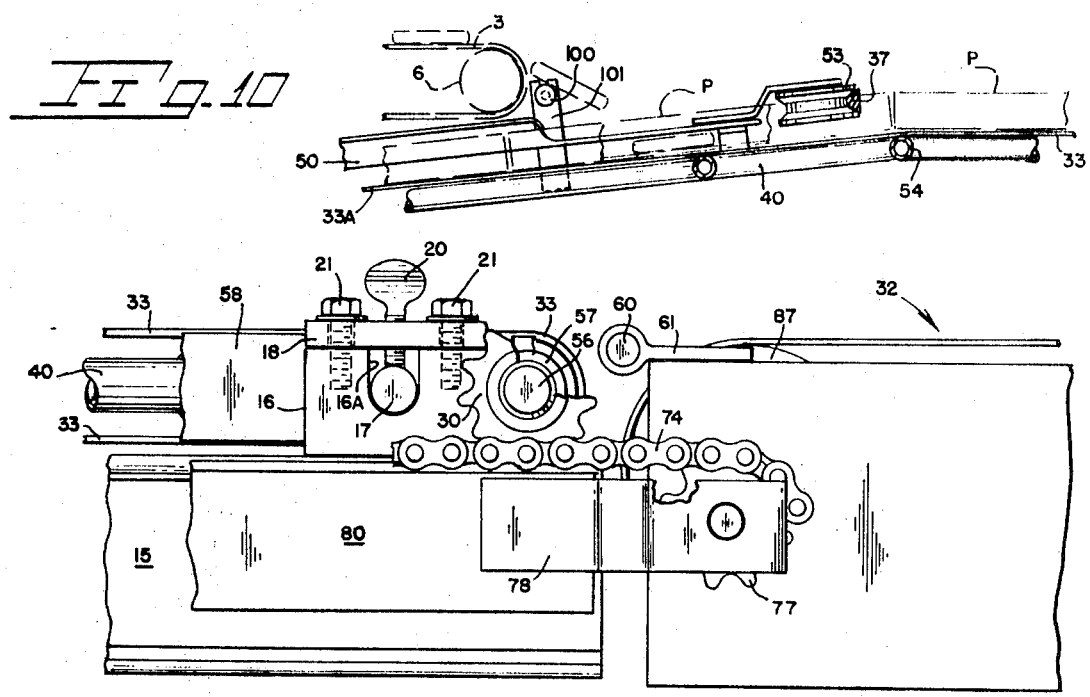

MACHINE FOR LOADING BAKING PANS

BACKGROUND OF THE INVENTION

The present invention relates generally to machinery for accomplishing the consecutive delivery of bakery pans to a bakery product conveyor line for automatic loading of the pans.

In the commercial baking industry various types of bakery products are formed initially in one continuous length and are conveyed in such form along a pastry table for slicing at intervals. Pastry tables, as known in the art, in addition to having a conveyor belt and slicing means incorporate powered, angularly disposed rollers for progressively forming the dough into a continuous cylindrical roll prior to slicing thereof. Such pastry tables are widely known in the art and conventionally deliver to a crew of workers the sliced bakery products for the hand loading or "panning" of the products into a baking pan. The pans used may be of the size as the packaged retail product usually containing from six to 12 clustered rolls or the like or may be a two strap pan i.e. two united pans. The product is subsequently baked and packaged for sale. Foil trays in which the sliced bakery products are "panned" and later baked are handled with equal facility by the present invention.

Presently, bakeries employ several workers who are stationed along the conveyor of a pastry table who manually "pan" or place the sliced bakery products into the baking pan. Obviously the production costs of the bakery product are to a large part made up of costly man-hour effort which effort to a considerably extent is avoided by use of the present invention. From a pan loading crew of several people the task may now be accomplished with but one or two machine attendants at a substantial cost savings.

The present machine allows for convenient conversion of the associated pastry table to other types of pastry production wherein it is not desired that the product be placed into small baking pans of the same size as that of the retailed product for baking as a clustered product. Since both lines of products are run in large commercial bakeries it is important that the pastry table may be readily convertible from one type to the other with little down time of the equipment.

SUMMARY

The machine provides for the coordinated, consecutive delivery of baking pans past the end of a pastry table belt conveyor whereat sliced bakery products are discharged from the belt into the subjacently traveling pan. The pan conveyor assembly extends below and outwardly from the pastry table conveyor for delivery of the loaded pans to a station whereat the pans are loaded onto baking trays. Powering means for the pan conveyor is controllable at precise speeds to coordinate pan delivery with delivery of the desired quantity of bakery products for desired uniform loading of each pan. The pan conveyor assembly is removably mounted for purposes of interchangability and periodic cleaning with no tedious disconnections of drive means being necessary.

The primary object of the invention is the performance of that operation, known in the art as "panning" of automatically loading relatively small pans heretofore loaded manually by a crew of workers. This is accomplished by the passage of the pan beneath the discharge end of a pastry table conveyor to receive the desired quantity of the product, the pan delivery being synchronized with the discharge of the bakery product.

The close disposition of the pan conveyor assembly to the discharge end of the belt of the pastry table assures the desired laying over of the sliced bakery product into the delivered pan. Previously it was necessary to manually grasp each sliced article, rotate same 90° and place it in the pan which required careful placement since the articles substantially fill the pan area.

A further object of the present machine is to permit different types of pastry production runs with but a simple interchange of the pan conveyor assembly with a second conveyor assembly.

BRIEF DESCRIPTION OF THE DRAWINGS

In the accompanying drawings;

FIG. 1 is an isometric view in schematic form of the machine for loading baking pans, FIG. 2 is an isometric view in schematic form of the pan conveyor assembly, FIG. 3 is a sectioned, side elevational view of the machine shown in FIG. 1 with portions of an associated pastry table broken away for purposes of illustration, FIG. 3A if a view similar to FIG. 3 of a second conveyor assembly substituted for the pan conveyor assembly shown in FIGS. 1—3, FIG. 4 is a plan view of FIG. 3 with details of the guilotine and the pastry table conveyor belt being shown in dashed lines, FIG. 5 is an enlarged end elevational view of the left-hand end of the pan conveyor assembly, FIG. 6 is a sectional view taken along line 6-14 6 of FIG. 4 showing one pan conveyor belt, FIG. 7 is an enlarged detail view of that part of the present invention circled at 7 in FIG. 4, FIG. 8 is an end elevational view of the machine with roller chains removed and taken along line 8–8 of FIG. 3, FIG. 9 is an enlarged side elevational view of the machine structure shown in FIG. 7, and FIG. 10 is a view similar to FIG. 6 showing a deflector roller inserted in place.

DESCRIPTION OF PREFERRED EMBODIMENT

With continuing reference to the drawings wherein applied reference numerals indicate parts similarly identified in the following specification the reference numeral 1 indicates generally a machine for loading baking pans. The machine is shown in association with a pastry table indicated generally at 2 along which pastry products are conveyed.

The pastry table 2 conventionally comprises a continuous belt 3 which receives partially completed pastry products for transfer therealong and which, depending on the type of pastry, may include means (not shown) for rolling the pastry dough into continuous rolls as for example in the production of cinammon rolls. For severing the rolled dough into the desired product size a reciprocal blade 4 is utilized such being conventionally provided in a machine 5 known in the present art as a guilotine machine. Both the construction and operation of pastry table 2 and the guilotine machine are well known in the art and hence require no further detailed description.

In the present disclosure the guilotine machine 5 is shown incorporating an idler roller 6 supporting one end of belt 3 and on which roller blade 4 slices. Such disposition of the guilotine with its blade 4 cutting against the underlying roller 6 insures clean separation and discharge of the individual pastry products with the blade 4 being capable of limited horizontal movement with the dough being sliced. For proper vertical spacing of belts, hereinafter elaborated upon, the roller 6 is preferably of a reduced diameter approximately 1 inch or so.

With attention to both FIGS. 3 and 4 a pan conveyor assembly is indicated generally at 10 supported upon a tablelike framework generally at 11 said assembly extending subjacently past roller 6 and the discharge end of the pastry table's continuous belt 3.

The machine's framework supporting the pan conveyor assembly includes legs 12 interconnected by angle crossmembers 13 and by lengthwise extending stringers 14 which also serve to support later described means for powering the pan conveyor assembly.

Supported by the pairs of legs 12 are framework side members 15 which may be of channel stock extending horizontally the length of the framework and shown sectioned for purposes of illustration. The side members terminate forwardly in proximity of the guilotine machine 5 and on their upper faces mount holddown blocks 16 which receive and position in place the pan conveyor assembly 10.

As best shown in FIG. 9 hold down blocks 16 are each recessed at 16A to receive laterally projecting tubular support members 17 of the pan conveyor assembly. Blocks 16 further include closure plates 18 through each of which extends thumbscrews 20 the latter functioning to securely seat and retain said support members in said blocks. Pairs of bolts 21 serve to swingably attach the closure plates 18 to their blocks with each of said plates being machined at 22 (FIG. 7) to allow same to be swung outwardly permitting convenient removal of the supports 17 and hence the pan conveyor assembly 10.

As shown in FIG. 3A hold down blocks 16 also serve to retain in place on the frame work a second conveyor assembly generally at 23 having, in similarity to the first-described conveyor assembly laterally extending tubular support members 24 and thereby also adapted to be mounted in place on the framework by said holddown blocks. This second conveyor assembly may advantageously comprise a continuous wire mesh conveyor belt 29 carried on end mounted rollers 25—26 with roller 26 provided with and driven by a sprocket 27. Sprocket 27 is downwardly engageable with a roller chain in the manner later described in connection with a similar sprocket drive of the pan conveyor assembly. The counterpart of this sprocket in the pan conveyor assembly 10 is best shown at 30 in FIG. 9 with both conveyor assemblies utilizing the same underun sprocket-type of drive which allows sprocket disengagement by simply lifting of the assemblies.

The second conveyor assembly of FIG. 3A is for use in production of glazed pastry products wherein glazing solution is sprayed on the product with excess passing through the wire mesh for collection in tanks (not shown) positionable upon crossmembers 13 of the framework. From this it will be evident that the present machine 10 may be readily converted from a pan conveyor assembly to the second or product conveyor assembly by means of the holddown blocks 16 and the sprocket drive arrangement commonly used by both conveyor assemblies.

Both conveyor assemblies are disclosed as off loading onto the receiving end of a second pastry conveyor table indicated generally at 32 along which loaded baking pans or alternately individual pastry articles are moved.

With further attention toward the pan conveyor assembly 10 a belt 33 travels the length thereof with the pan on loading end thereof carried by a roller 35 and receiving baking pans discharged from the end of a curved pan conveyor indicated generally at 36. Roller 35 may be termed a power transfer roller in that in addition to carrying the on loading end of belt 33 it functions to drive additional pan conveyor assembly components. With attention to the left-hand end of FIG. 4 and FIG. 5 a gear drive assembly is shown by which a pair of V-belts 37 are driven to assist the pan conveyor belt 33 in the inclined movement of the baking pans P. The bevel gear drive assembly for the V-belts is fully supported by and at the ends of a pair of longitudinally disposed members 40 of the pan conveyor assembly and hence is removable therewith from the machine framework 11.

Projecting forwardly from the conveyor frame members 40 are adjustable extensions 41 both of which terminate in securement with an angle iron crossmember 42. This crossmember carries the gear drive assembly which includes a pair of horizontally disposed bevel gears 43 on spindles 44 journaled in bearings 45 the latter welded to said crossmember. Affixed to the upper ends of each spindle is a drive pulley 46 for the two V-belts 37. The belt carrying power transfer roller 35 is mounted on a shaft 47 journaled in bearing blocks 48 and which mounts bevel gears 49 in mesh with the aforementioned bevel gears. Angle braces 38 on bearings 45 support bearing blocks 48.

The adjustable extensions 41 may comprise threaded shafts extending through nut elements welded to the ends of the conveyor frame members 40 whereupon rotation of the threaded shafts may serve to tension the pan conveyor belt 33 as desired.

Located adjacent opposite sides of the belt along its inclined portion indicated at 33A are Z-shaped pan retainers 50 of shaped metal with longitudinally extending flanges 51 which extend inwardly over the pan contacting runs at 37A of V-belts 37. Flanges 51 serve to hold the pans P against riding up over adjacent contiguously disposed pans while same are being carried upwardly along the pan conveyor belt. Adjustably attaching the pan retainers 50 to the conveyor frame members 40 are plates 52 with elongate openings therein for the reception of a machine screw 39 received within a threaded opening in said frame member. Accordingly upon loosening of the machine screws the plates and pan retainers 50 carried thereby may be adjusted laterally while maintaining parallel relationship and then set to receive pans of various widths. The retainers so positioned will prevent belt deflection to insure pan and V-belt contact along runs 37A. End mounted on pan retainers 50 and movable therewith are pairs of idler pulleys 53 for the V-belts 37. The pair of longitudinally extending members 40 are inclined downwardly for a portion of their length with the continuous pan conveyor belt 33 also extending the length of the pan conveyor assembly and disposed between said conveyor frame members. In similarity thereto the belt 33 has downwardly inclined upper and lower runs the upper of which at 33A passing closely subjacent to the discharge end of the pastry table conveyor belt 3.

Interconnecting the conveyor frame members 40 at intervals therealong are spacers at 54 with a somewhat longer spacer 55 interconnecting diverging ends of said frame members 40 at the off loading end of the pan conveyor assembly. An additional spacer at 59 (FIG. 3) serves to support the lower run of the belt 33 and may include a roller to reduce drag on the belt. Carried by said diverging ends is a driving roller 56 for pan conveyor belt 33 the roller being journaled adjacent its reduced ends in bearings 57 mounted in brackets 58 all integral with the conveyor frame. Roller 56 is centrally knurled for positive traction with belt 33. The aforementioned sprocket 30 as shown in FIG. 7 and 8 is carried at one end of roller 56 and drives same by engagement with an underunning roller chain 74. The pan conveyor belt 33 is of the type having a roughened or textured pan supporting surface to inhibit pan slippage while the V-belts 37 assist in the inclined movement of the baking pans. The vertical distance between the discharge end of belt 3 and the subjacent portion of upper run 33A of the pan conveyor belt is approximately 2 inches to insure proper laying over of the product.

For consecutive delivery of pans onto the pan conveyor assembly 10 the 90 conveyor 36 with wire mesh belting has proven satisfactorily. These type of conveyors are widely used throughout the baking industry and include a roller mounted belt of linked wire with sides of the conveyor being of unequal length to enable its operation throughout a 90° curve. Other such types of conveyor in feed units may be found entirely practical for directing a continuous supply of baking pans below the pastry table 2 and onto the pan conveyor assembly the particular unit being considered only as a matter of choice and not effecting the present invention's scope.

To assist in the transfer of baking pans or individual pastry products off the pan conveyor belt 33 and onto the continuous belt of the pastry table 32 an intermediate driven shaft 60 is provided as best shown an intermediate driven shaft 60 is provided as best shown in FIGS. 4 and 9. For the sake of convenience this shaft is journaled in hangers 61 carried by the side rails of the pastry table 32 and is sprocket driven at 62 by a chain drive later described.

To drive the belt 33 of the pan conveyor assembly at the precise speed required a DC electric motor 65 is utilized. The motor's output speed is controllable through an operator control (not shown) which control enables the machine operator to synchronize the speed of belt 33 with the speed of belt 3 of pastry table 2. Uniform filling of the pans P, usually with six or eight pastry articles is accordingly accomplished. The speed of belt 3 is of course determined by the conventional motor and drive means of the pastry table 2 while the reciprocal movement of blade 4 of the guilotine machine 5 is independently settable to slice the pastry into desired product sizes. The coordinated speed settings of belt 3 and blade 4 are each accomplished through mechanisms conventionally provided as part of the pastry table 2 and guilotine machine 5.

Proper setting of the speed of pan conveyor belt 33 will accomplish the desired loading of each pan P. The setting of the speed of the pastry table belt 3 will determine the interval at which the severed articles are discharged the interval being such as to permit the passage of contiguous pan rims beneath the discharge end of belt 3 to avert the discharge of a severed pastry product thereon.

The motor 65 drives through a speed reducer unit 66 having a drive sprocket 67 on which a first roller chain 68 is entrained the chain in turn driving a second sprocket 70 carried by a shaft 71 which as seen in FIG. 8 is rotatably supported at 79 on a pair of the framework legs 12. Also mounted on the shaft 71 is a somewhat smaller sprocket at 73 which powers a chain drive including a roller chain 74 which is entrained upwardly over an idler sprocket 75 thence forwardly about another idler 76. A companion idler sprocket at 77 is disposed at the opposite end of the framework side member 15 both idlers 76, 77 being carried on stub shafts borne by brackets 78. A roller chain guide plate at 80 supports both brackets which are offset somewhat from the plate to align the idler sprockets 76, 77 therewith. The guide plate 80 accordingly supports the roller chain 74 for horizontal travel. The supported segment of chain travels from right to left as viewed in FIG. 3 causing underun sprocket 30 and powered roller 56 to rotate in a clockwise direction moving the upper run of belt 33 in the direction indicated.

Chain 74 is further entrained over an idler sprocket 81 and a sprocket 82 carried by a shaft 83 carried in bearings 84 (FIG. 8) and which extends transversely across the framework 11. Shaft 83 extends outwardly past the framework on the unseen side of FIG. 3 and there at receives a first sprocket 85 and a second sprocket 86. Sprocket 85 is in driving engagement with a belt carrying roller 87 (FIG. 9) of pastry conveyor table 37 while the second sprocket 86 on shaft 83 is in driving engagement with a sprocket 62 (FIG. 8) carried by the aforementioned shaft 60. By this arrangement the belt speed of table 32 is conveniently varied along with the speed of pan conveyor belt 33 to receive and transfer the pans discharged therefrom or alternatively the discharged individual pastry products.

With attention to FIGS. 3 and 8 the shaft 83 additionally carries a driving sprocket 90 for the 90° conveyor indicated at 36 to allow its speed and hence the rate at which bakery pans P are moved onto the pan conveyor assembly 10 to be controlled simultaneously with the speed of pan conveyor belt 33. To accomplish this a chain drive 92 extends downwardly about a series of idler sprockets 93 and 94 and thence upwardly and over a sprocket drive for the driving roller of the 90° conveyor. Chain 92 returns via idler sprockets 96, 97, 98 and 99 rotatably carried by framework 11 and the guilotine machine 5.

With attention again directed to the motor 65 a control is provided at the operator station enabling the motor speed to be accurately set for proper pan delivery beneath the discharge end of the pastry table belt 3. An entirely satisfactory motor for such use in a Boston Gear Ratiotrol DC motor manufactured and sold commercially by the Boston Gear Works.

In operation baking pans are fed to the present machine by conveyor exemplary shown as a 90° type conveyor at 36. The pans are received by the pan conveyor belt 33 and carried in a contiguous manner along inclined belt portion 33A. The V-belts 37 assist in this inclined movement with the pan retainers 50 preventing the overriding of one pan on another. The pans pass the discharge end of belt 3 in an end-to-end manner to receive the specified quantity of sliced bakery products. The vertical distance between the end of belt 3 and the subjacent portion of pan conveyor belt 33A is such that the product will rotate through 90° in its fall into the pan as is desired. The machine attendant need only inspect each filled pan for even placement of the products therein. The filled pans are discharged from belt 33 onto pastry table 32 wherefrom additional workers may transfer the pans onto trays for baking.

When it is desired to run folded or flat pastry products e.g. breakfast rolls, bear claws a deflector roller 100 is placed within brackets 101 carried by the pan conveyor frame members 40. This roller disposed immediately off the end of the main pastry table conveyor belt 3 functions to deflect upwardly the leading edge of the product as shown in FIG. 10 to assure plan deposit within the pan.

Having thus described the invention what I claim and desire to be secured under Letters Patent is:

1. A machine for conveying pans for the loading of the pans with a specific number of articles such articles being delivered and discharged in a continuous manner to the machine, said machine comprising;

a framework for interchangeably supporting a pan conveyor assembly and a second belt conveyor assembly, said pan conveyor assembly removably mounted upon said framework and including, a continuously moving pan conveyor belt inclined for a portion of its length for the conveying of pans along an inclined path, said belt passing subjacently in an inclined manner upwardly past a discharge point of the articles for the loading of pans carried thereon, powered means contactable against opposed sides of the pans to assist said pan conveyor belt in the inclined movement of pans, and means for continuously driving said pan conveyor belt or alternatively the belt of the second conveyor assembly when in place on the framework, said last-mentioned means including a motor having a control for regulating the motor to vary the speed of either of said belts and accordingly the interval between the deposit of consecutive articles relative to said pans or the belt of the second conveyor system.

2. A machine for conveying baking pans or the like past the discharge end of a pastry table conveyor belt for loading each pan with a uniform number of individual pastry articles, said machine comprising, a framework located adjacent at the discharge end of a pastry table conveyor belt, a pan conveyor assembly supported by said framework and including frame members extending subjacently past the discharge end of said pastry table conveyor belt with the conveyor assembly further including, rollers journaled at the ends of said frame members and a pan conveyor belt carried by said rollers, powered means contactable with the sides of the pans and assisting said pan conveyor belt in the movement of the pans, pan retainer means for maintaining the pans in full resting contact with the pan conveyor belt, and means for driving said pan conveyor belt including a motor having a control for regulating the motor to vary the speed of said pan conveyor belt and accordingly the duration required for pan passage past the discharge end of the pastry table to effect the desired quantity of articles loaded into each pan.

3. The machine as claimed in claim 2 wherein said powered means are adjustably carried by said frame members whereby pans of various widths may be conveyed by said pan conveyor assembly.

4. The machine as claimed in claim 2 wherein said powered means is driven by said pan conveyor belt.

5. The machine as claimed in claim 2 wherein the said framework of the machine is adapted to support said pan conveyor assembly in a removable manner and to alternately receive a second conveyor assembly in place thereof, both said pan conveyor assembly and said second conveyor assembly having drive sprockets associated therewith for driven engagement with said first mentioned means.

6. The machine as claimed in claim 2 wherein said pan conveyor assembly further includes a deflector mountable thereon adjacent the discharge end of the pastry table to prevent rotation of certain types of pastry products as desired.